(12) United States Patent
Huang

(10) Patent No.: US 7,069,257 B2
(45) Date of Patent: Jun. 27, 2006

(54) PATTERN RECOGNITION METHOD FOR REDUCING CLASSIFICATION ERRORS

(75) Inventor: Yea-Shuan Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 508 days.

(21) Appl. No.: 10/279,815

(22) Filed: Oct. 25, 2002

(65) Prior Publication Data

US 2004/0002928 A1 Jan. 1, 2004

(30) Foreign Application Priority Data

Jun. 27, 2002 (TW) .............................. 91114147 A

(51) Int. Cl.
*G06N 3/02* (2006.01)
(52) U.S. Cl. .............................. 706/20; 706/15; 706/25
(58) Field of Classification Search .................... 706/20
See application file for complete search history.

(56) References Cited

U.S. PATENT DOCUMENTS 5,371,809 A * 12/1994 Desieno ....................... 382/159
5,487,133 A * 1/1996 Park et al. ..................... 706/20
5,675,497 A * 10/1997 Petsche et al. ............... 702/182
5,701,398 A * 12/1997 Glier et al. .................... 706/41
6,090,044 A * 7/2000 Bishop et al. ............... 600/300

\* cited by examiner

*Primary Examiner*—Anthony Knight
*Assistant Examiner*—Sergey Datskovskiy
(74) *Attorney, Agent, or Firm*—Bacon & Thomas, PLLC

(57) ABSTRACT

A RBF pattern recognition method for reducing classification errors is provided. An optimum RBF training approach is obtained for reducing an error calculated by an error function. The invention continuously generates the updated differences of parameters in the learning process of recognizing training samples. The modified parameters are employed to stepwise adjust the RBF neural network. The invention can distinguish different degrees of importance and learning contributions among the training samples and evaluate the learning contribution of each training sample for obtaining differences of the parameters of the training samples. When the learning contribution is larger, the updated difference is larger to speed up the learning. Thus, the difference of the parameters is zero when the training samples are classified as the correct pattern type.

8 Claims, 2 Drawing Sheets

PATTERN RECOGNITION METHOD FOR REDUCING CLASSIFICATION ERRORS

BACKGROUND OF THE INVENTION

1. Field of the Invention

The present invention relates to the technical field of image recognition and, more particularly, to a radial basis function (RBF) neural network pattern recognition method for reducing classification errors.

2. Description of Related Art

Conventionally, in the field of data processing, a RBF neural network is used in a broad variety of applications such as fault detection, fault diagnosis, speech recognition, image recognition, etc. The RBF neural network is advantageous as compared with an error back-propagation learning algorithm. This is because parameters should be repeatedly updated and trained for increasing a precision of a computer system for pattern recognition. Also, as compared with other networks, the RBF neural network is faster to be trained. It is found that all networks may have the same drawback of incompleteness of data collection in training samples. Advantageously, the RBF neural network provides low output responses to inputs that fall into regions of the data space where there is no training sample. Moreover, the RBF neural network can distinguish different learning contributions among training samples for generating different quantities of learning which are in turn used to update and enhance features of the computer system. That is, the RBF neural network may exploit localized basis functions such that learning of each input sample affects a specialized subset of the network parameters.

In a well-known process of training the computer system by the RBF neural network, a plurality of different pattern types are stored in the computer system. Also, samples for training the computer system belong to a specific one of the pattern types. The computer system calculates an output value of each training sample in respective pattern data. In a case that a maximum output value appears in the specific pattern type associated with the training samples, it means a correct recognition of the computer system. In another case that the maximum output value appears in any of other pattern types, it means that a gradient descent optimization algorithm is required to calculate a least means square error (LMSE) between the output value of in the specific pattern type and the maximum output value thereof. Consequently, the LMSE is used to generate parameters for updating the computer system in order to increase recognition accuracy.

However, the recognition accuracy of the LMSE is low even though it is advantageous in calculating an approximation function. Further, error may be accumulated as a result of an increase of the number of erroneous classifications in a maximum-likelihood classifier because the LMSE cannot correspond to a classification error calculated by the maximum-likelihood classifier. This can greatly reduce a performance of the computer system. Thus, there is desired to provide a novel pattern recognition method to mitigate and/or obviate the aforementioned problems.

SUMMARY OF THE INVENTION

An object of the present invention is to provide a radial basis function (RBF) neural network pattern recognition method for reducing classification errors. The invention generates the updated differences of parameters by recognizing a feature vector of training samples. The modified parameters are employed to stepwise adjust a setting of the RBF neural network, resulting in an increase of recognition accuracy.

Another object of the present invention is to distinguish different degrees of importance and learning contributions among the training samples and evaluate the learning contribution of each training sample for obtaining differences of the parameters of the training samples.

To achieve the object, the present invention provides a pattern recognition method for reducing classification errors by using RBF neural network. The RBF neural network includes an input layer, a kernel layer having a plurality of pattern types, each having a plurality of hidden neurons, each corresponding to a kernel function, and an output layer having a plurality of output neurons, each corresponding to a pattern type of the kernel layer. The pattern recognition method for reducing classification errors comprises the steps of (A) inputting a feature vector formed by a plurality of training samples to the input layer wherein the feature vector comprises a plurality of features each forming a corresponding one of a plurality of input neurons in the input layer; (B) calculating a measured value of the kernel layer relative to the hidden neuron by each of the input neurons based on a kernel function of each hidden neuron; (C) for each output neuron of the output layer, multiplying the measured value of the kernel layer corresponding to the pattern type associated with the output neuron by a weight for obtaining a measured value of the output layer corresponding to the pattern type; (D) finding a maximum one of the measured values of the output layer and an error relative to a correct one of the measured values of the output layer; and (E) modifying values of parameters of the kernel function and calculating a weight of the measured values of the output layer based on the error.

Other objects, advantages, and novel features of the invention will become more apparent from the detailed description when taken in conjunction with the accompanying drawings.

DETAILED DESCRIPTION OF THE PREFERRED EMBODIMENT

Figure 1:
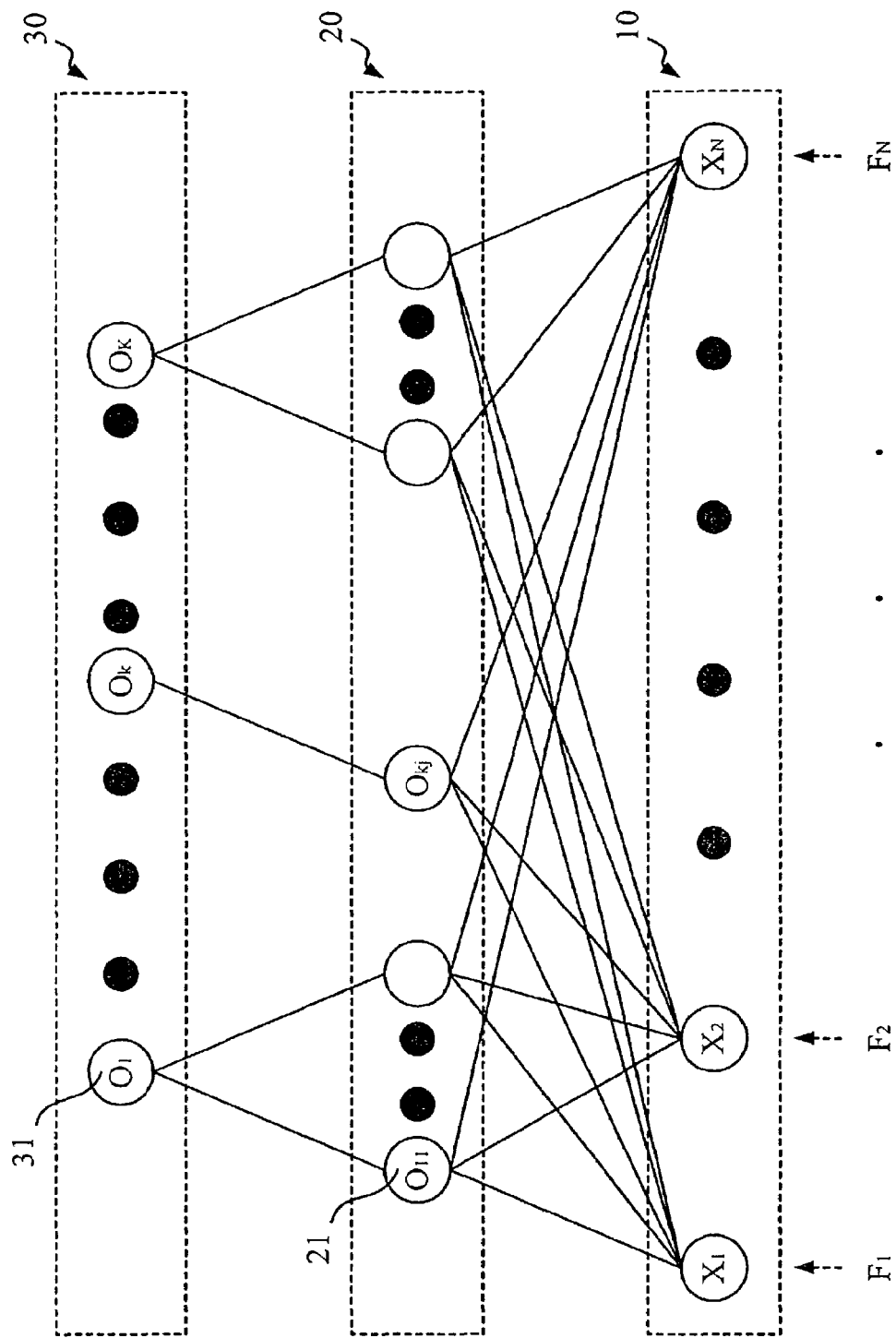
FIG. 1 schematically illustrates a RBF neural network according to the invention.

With reference to FIG. 1, there is shown a RBF neural network for performing the pattern recognition method for reducing classification errors according to the invention. The RBF neural network comprises an input layer 10, a kernel layer 20, and an output layer 30. The kernel layer 20 comprises K pattern types. Each pattern type has a plurality of hidden neurons 21, each corresponding to a kernel function as a reference model for representing, for example, a person's face. The kernel function is a facial expression model of the person, typically an exemplary facial expression. Alternatively, the kernel function is an image reference model of one of a plurality of different taken angles. That is, respective hidden neuron 21 of each pattern type corresponds one of a plurality of different facial expressions taken in different angles. The output layer 30 comprises K output neurons 31, each corresponding to a pattern type of the kernel layer 20.

Figure 2:
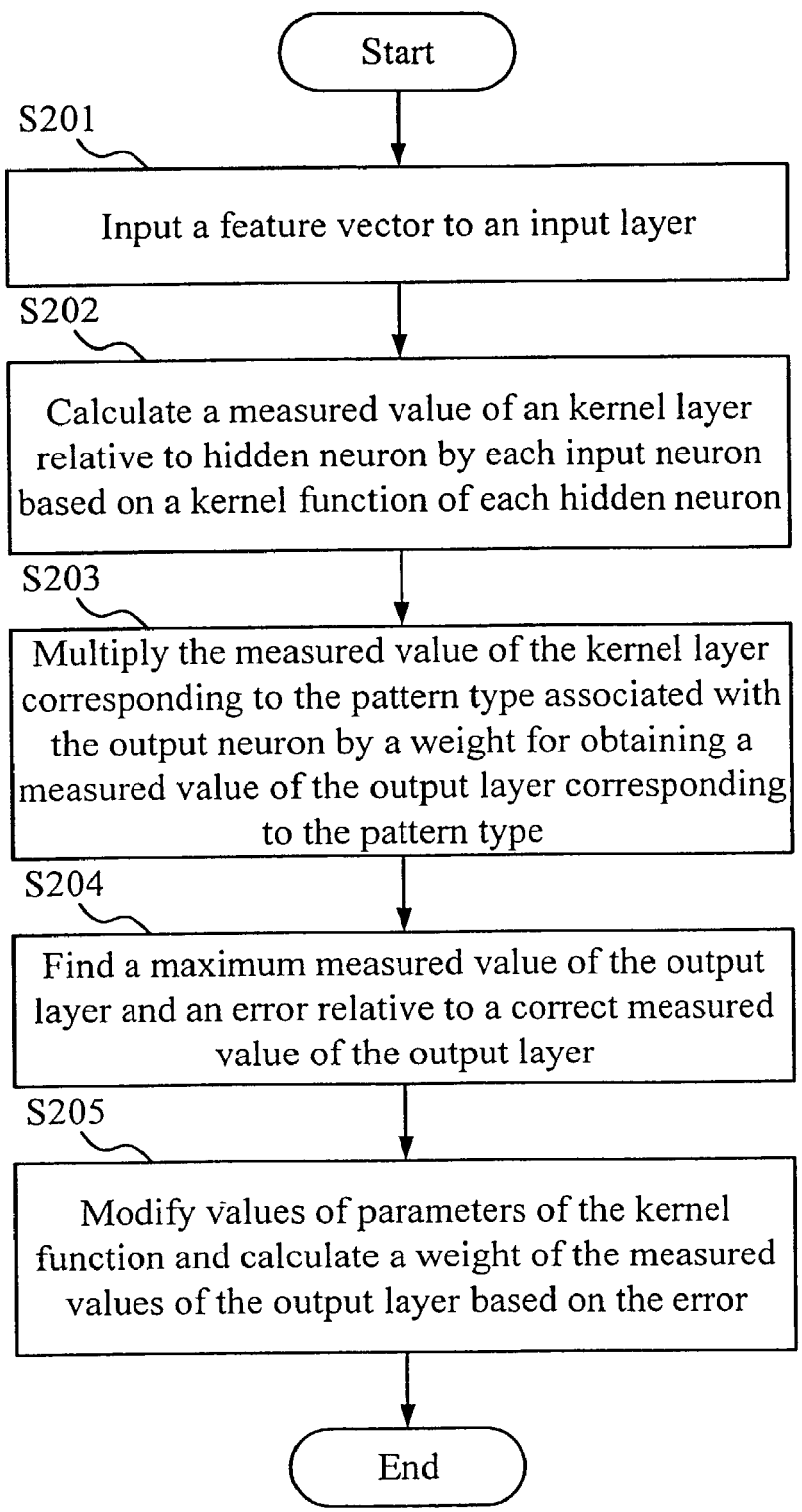
FIG. 2 is a flow chart illustrating a training process of pattern recognition according to the invention.

With reference to FIG. 2, there is shown a flow chart illustrating a training process of pattern recognition of the invention. In step S201, a feature vector formed by training samples is inputted to the input layer 10. The feature vector comprises N features $F_i$, $1 \leq i \leq N$, such as pattern area of the training sample, measured length, aspect ratio, image luminance, etc. Moreover, each feature will form a corresponding input neuron $x_i$, $1 \leq i \leq N$, in the input layer 10.

In step S202, there is determined a measured value of the kernel layer 20 relative to the hidden neuron 21 by each of the input neurons $x_i$ based on a kernel function of each hidden neuron 21. In this embodiment, the kernel function is a Gaussian function $$O_{kj} = \exp\left(-\sum_{i=1}^{N} w_{kji}(x_i - C_{kji})^2\right),$$

where k is the k-th pattern type of the kernel layer 20, j is the j-th hidden neuron 21 of the k-th pattern type, $O_{kj}$ is the corresponding kernel function of the j-th hidden neuron 21 in the k-th pattern type, $C_{kji}$ is the corresponding reference model feature of a reference model of each hidden neuron 21, N is the number of the hidden neurons 21, and $w_{kji}$ is a weight of a reference model of $C_{kji}$. In this embodiment, a clustering approach is employed to fetch a plurality of appropriate clusters from the pattern types. Thus, the initial value of $C_{kji}$ is a cluster means and the initial value of $w_{kji}$ is an inverse of cluster variance.

In step S203, for each output neuron 31 of the output layer 30, the measured value $O_{kj}$ of the kernel layer 20 corresponding to the pattern type associated with the output neuron 31 is multiplied by a weight. As a result, a measured value of the output layer 30 corresponding to the pattern type is calculated, i.e., $$O_k = \sum_{j=1}^{k_n} \lambda_{kj} O_{kj},$$

$1 \leq k \leq K$, where $\lambda_{kj}$ is a weight of the measured value of the kernel layer 20 and $k_n$ is the number of the hidden neurons 21 corresponding to the k-th pattern type.

In step S204, a maximum measured value $O_M$ of the output layer 30 is found from all measured values $O_k$ ($1 \leq k \leq K$) of the output layer 30, i.e., $$O_M = \max_{1 \leq k \leq K} O_k$$

and an error relative to a correct measured value $O_T$ of the output layer 30. Note that training samples are served for training the RBF neural network. Hence, at the time of inputting training samples, a pattern type associated with each training sample is already known to the RBF neural network. As a result, the measured value of the output layer 30 obtained in the corresponding pattern type by the feature vector of the training sample is the correct measured value $O_T$ of the output layer 30. An error E is obtained by calculating an error function $E(x) = 1 - e^{(O_T - O_M)A(n)}$, where $0 \leq A(n+1) \leq A(n)$ and n is an epoch iteration number. A value of the error E is either one of the following cases when A(n) approaches zero:

$$E = 1, \text{ if } O_T < O_M; \text{ and}$$

$$E = 0, \text{ if } O_T = O_M.$$

Moreover, for a certain A(n), (e.g. A(n)=0.5), when $O_T < O_M$ and $O_T \approx O_M$, $e^{(O_T - O_M)/A(n)}$ will approach one. That is, a value of 1−E approaches one. As a result, a large quantity of learning is obtained with respect to the RBF neural network. On the contrary, when $O_T < O_M$ and $O_T \ll O_M$, $e^{(O_T - O_M)/A(n)}$ will approach zero. That is, a value of 1−E approaches zero. As a result, a small quantity of learning is obtained with respect to the RBF neural network.

In step S205, the RBF neural network modifies values of parameters $C_{kji}$ and $w_{kji}$ of the kernel function and calculates a weight $\lambda_{kj}$ of the measured value of the output layer 30 based on the error E. In this embodiment, a generalized delta rule is carried out to generate updated difference of parameter $C_{kji}$, $w_{kji}$, and $\lambda_{kj}$:

$$\nabla C_{kji} = -\alpha(n) \frac{\partial E}{\partial C_{kji}},$$

$$\nabla \lambda_{kj} = -\beta(n) \frac{\partial E}{\partial \lambda_{kj}}, \text{ and}$$

$$\nabla w_{kji} = -\gamma(n) \frac{\partial E}{\partial w_{kji}},$$

where $\alpha(n)$, $\beta(n)$, and $\gamma(n)$ are three positive and monotonically-decreasing learning rates. Also, a chain rule is carried out to derive $$\frac{\delta E}{\delta C_{kji}} = \frac{\delta E}{\delta O_k} \frac{\delta O_k}{\delta O_{kj}} \frac{\delta O_{kj}}{\delta C_{kji}}, \text{ where } \frac{\delta E}{\delta O_k}, \frac{\delta O_k}{\delta O_{kj}}, \text{ and } \frac{\delta O_{kj}}{\delta C_{kji}}$$

are defined as follows:

$$\frac{\delta E}{\delta O_k} = \begin{cases} \frac{1}{A}(1-E), & \text{when } k = M; \\ -\frac{1}{A}(1-E), & \text{when } k = T; \\ 0, & \text{otherwise} \end{cases}$$

$$\frac{\delta O_k}{\delta O_{kj}} = \lambda_{kj}, \text{ and}$$

$$\frac{\delta O_{kj}}{\delta C_{kji}} = 2 O_{kj} w_{kji}(x_i - C_{kji}).$$

By combining the above equations, it is able to obtain the updated differences of the following parameters:

$$\nabla C_{kji} = \begin{cases} -\eta(1-E)\lambda_{kj} O_{kj} w_{kji}(x_i - C_{kji}), & \text{when } k = M \text{ and } O_T < O_M \\ \eta(1-E)\lambda_{kj} O_{kj} w_{kji}(x_i - C_{kji}), & \text{when } k = T \text{ and } O_T < O_M \\ 0, & \text{otherwise,} \end{cases}$$

where $\eta = 2\alpha/A$, and $\eta$ is a learning parameter; likewise, $$\nabla \lambda_{kj} = \begin{cases} -\theta(1-E)O_{kj}, & \text{when } k = M \text{ and } O_T < O_M \\ \theta(1-E)O_{kj}, & \text{when } k = T \text{ and } O_T < O_M \\ 0, & \text{otherwise,} \end{cases}$$

and $$\nabla w_{kji} = \begin{cases} \rho(1-E)\lambda_{kj}O_{kj}(x_i - C_{kji})^2, & \text{when } k = M \text{ and } O_T < O_M \\ -\rho(1-E)\lambda_{kj}O_{kj}(x_i - C_{kji})^2, & \text{when } k = T \text{ and } O_T < O_M \\ 0, & \text{otherwise,} \end{cases}$$

where $\theta=2\beta/A$, $\rho=2\gamma/A$, and both $\theta$ and $\rho$ are learning parameters. Moreover, $\eta$, $\theta$, and $\rho$ are generally monotonically decreasing.

Note that the above updated differences of the parameters are obtained by assuming $O_T<O_M$. In other words, the maximum measured value of the output layer 30 calculated by the RBF neural network is not equal to the correct measured value of the output layer 30. As a result, differences of the parameters will be generated by the RBF neural network.

In a practical training process, there is a need to appropriately update values of the parameters even a correct $O_T=O_M$ is calculated by the RBF neural network. As such, a further determination is made as to whether there is a measured value $O_S$ of the output layer 30 less than $O_T$ by a small value, i.e., $O_T<O_S+\epsilon$:, where $\epsilon$ is a small positive value (e.g. $\epsilon=0.02$). At this condition, the updated differences of the parameters $C_{kji}$, $w_{kji}$, and $\lambda_{kj}$ are as follows:

$$\nabla C_{kji}^m = \begin{cases} -\eta_1(1-E)\lambda_{kj}O_{kj}w_{kji}(x_i - C_{kji}), & \text{when } k = M \text{ and } O_T < O_M \\ \eta_1(1-E)\lambda_{kj}O_{kj}w_{kji}(x_i - C_{kji}), & \text{when } k = T \text{ and } O_T < O_M \\ -\eta_2(1-E^a)\lambda_{kj}O_{kj}w_{kji}(x_i - C_{kji}), & \text{when } k = S, O_T = O_M \text{ and } O_T < O_S + \varepsilon \\ \eta_2(1-E^a)\lambda_{kj}O_{kj}w_{kji}(x_i - C_{kji}), & \text{when } k = T, O_T = O_M \text{ and } O_T < O_S + \varepsilon \\ 0, & \text{otherwise,} \end{cases}$$

$$\nabla \lambda_{kj}^m = \begin{cases} -\theta_1(1-E)O_{kj}, & \text{when } k = M \text{ and } O_T < O_M \\ \theta_1(1-E)O_{kj}, & \text{when } k = T \text{ and } O_T < O_M \\ -\theta_2(1-E^a)O_{kj}, & \text{when } k = S, O_T = O_M \text{ and } O_T < O_S + \varepsilon \\ \theta_2(1-E^a)O_{kj}, & \text{when } k = T, O_T = O_M \text{ and } O_T < O_S + \varepsilon \\ 0, & \text{otherwise,} \end{cases}$$

and $$\nabla w_{kji}^m = \begin{cases} \rho_1(1-E)\lambda_{kj}O_{kj}(x_i - C_{kji})^2, & \text{when } k = M \text{ and } O_T < O_M \\ -\rho_1(1-E)\lambda_{kj}O_{kj}(x_i - C_{kji})^2, & \text{when } k = T \text{ and } O_T < O_M \\ \rho_2(1-E^a)\lambda_{kj}O_{kj}(x_i - C_{kji})^2, & \text{when } k = S, O_T = O_M \text{ and } O_T < O_S + \varepsilon \\ -\rho_2(1-E^a)\lambda_{kj}O_{kj}(x_i - C_{kji})^2, & \text{when } k = T, O_T = O_M \text{ and } O_T < O_S + \varepsilon \\ 0, & \text{otherwise} \end{cases}$$

where $\eta_1 \geq \eta_2$, $\theta_1 \geq \theta_2$, $\rho_1 \geq \rho_2$, $E^a = 1 - e^{(O_S - O_M)/A}$, and $O_S = \max_{k=1, k \neq M}^{K} O_k$.

As a result, a possibility of generating an obscure result is greatly reduced. Thus, a recognition correctness of the RBF neural network can be increased.

Based on the above updated differences of the parameters, the parameters $C_{kji}$, $w_{kji}$, and $\lambda_{kj}$ are modified as follows:

$$C_{kji} = C_{kji} + \nabla C_{kji}^m,$$

$$w_{kji} = w_{kji} + \nabla w_{kji}^m, \text{ and}$$

$$\lambda_{kj} = \lambda_{kj} + \nabla \lambda_{kj}^m.$$

In view of the foregoing, the invention generates the updated differences of parameters by recognizing the inputted training samples, and the modified parameters are employed to stepwise adjust a setting of the RBF neural network, resulting in an increase of recognition accuracy. Furthermore, the degree of importance and learning contribution of one training sample can be distinguished from that of the other. As a result, the training mechanism is enhanced, thereby establishing an optimum RBF neural network for recognizing patterns.

Although the present invention has been explained in relation to its preferred embodiment, it is to be understood that many other possible modifications and variations can be made without departing from the spirit and scope of the invention as hereinafter claimed.

What is claimed is:

1. A pattern recognition method for reducing classification errors by using a RBF neural network including an input layer, a kernel layer having a plurality of pattern types, each having a plurality of hidden neurons, each corresponding to a kernel function, and an output layer having a plurality of output neurons, each corresponding to a pattern type of the kernel layer, the pattern recognition method comprising the steps of:

(A) inputting a feature vector formed by a plurality of training samples to the input layer, wherein the feature vector comprises a plurality of features, each forming a corresponding one of a plurality of input neurons in the input layer;

(B) calculating a measured value of the kernel layer relative to the hidden neuron by each of the input neurons based on a kernel function of each hidden neuron;

(C) for each output neuron of the output layer, multiplying the measured value of the kernel layer corresponding to the pattern type associated with the output neuron by a weight for obtaining a measured value of the output layer corresponding to the pattern type;

(D) finding a maximum one of the measured values of the output layer and a class classification error relative to a correct one of the measured values of the output layer, wherein the class classification error is obtained by calculating an error function $E(x)=1-e^{(O_T-O_M)/A(n)}$, where $O_M$ is the maximum one of the measured values of the output layer, $O_T$ is the correct measured value of the output layer, $0 \leq A(n+1) \leq A(n)$, and n is an epoch iteration number; and (E) modifying values of parameters of the kernel function and calculating a weight of the measured values of the output layer based on the error.

2. The method as claimed in claim 1, wherein in the step (D), the correct measured value of the output layer is the measured value of the output layer obtained in the corresponding pattern type by the feature vector.

3. The method as claimed in claim 1, wherein the kernel function corresponding to the hidden neuron is a Gaussian function.

4. The method as claimed in claim 3, wherein the kernel function corresponding to the hidden neuron is defined by $$O_{kj} = \exp\left(-\sum_{i=1}^{N} w_{kji}(x_i - C_{kji})^2\right),$$

where $x_i$ is the i-th input neuron, $C_{kji}$ is a corresponding reference model feature of a reference model of each hidden neuron, $w_{kji}$ is a weight of a reference model of $C_{kji}$, and N is the number of the hidden neurons.

5. The method as claimed in claim 4, wherein an initial value of $w_{kji}$ and an initial value of $C_{kji}$ is obtained by fetching a plurality of clusters from the pattern types according to a clustering approach, where the initial value of $C_{kji}$ is a cluster means and the initial value of $w_{kji}$ is an inverse of cluster variance.

6. The method as claimed in claim 4, wherein, in the step (C), the measured value of the output layer is $$O_k = \sum_{j=1}^{k_n} \lambda_{kj} O_{kj},$$

where $\lambda_{kj}$ is a weight of the measured value of the kernel layer and $k_n$ is the number of the hidden neurons corresponding to the k-th pattern type.

7. The method as claimed in claim 1, wherein, in the step (E), there is executed a chain rule to derive $$\frac{\delta E}{\delta C_{kji}} = \frac{\delta E}{\delta O_k} \frac{\delta O_k}{\delta O_{kj}} \frac{\delta O_{kj}}{\delta C_{kji}},$$

and a generalized delta rule is based to generate updated differences of the parameters $C_{kji}$, $w_{kji}$, and $\lambda_{kj}$ represented as:

$$\nabla C_{kji} = -\alpha(n) \frac{\partial E}{\partial C_{kji}},$$

$$\nabla \lambda_{kj} = -\beta(n) \frac{\partial E}{\partial \lambda_{kj}}, \text{ and}$$

$$\nabla w_{kji} = -\gamma(n) \frac{\partial E}{\partial w_{kji}},$$

so that, when $O_T < O_M$, the updated differences of the parameters $C_{kji}$, $w_{kji}$, and $\lambda_{kj}$ are represented as:

$$\nabla C_{kji} = \begin{cases} -\eta(1-E)\lambda_{kj}O_{kj}w_{kji}(x_i - C_{kji}), & \text{when } k = M \text{ and } O_T < O_M \\ \eta(1-E)\lambda_{kj}O_{kj}w_{kji}(x_i - C_{kji}), & \text{when } k = T \text{ and } O_T < O_M \\ 0, & \text{otherwise,} \end{cases}$$

$$\nabla \lambda_{kj} = \begin{cases} -\theta(1-E)O_{kj}, & \text{when } k = M \text{ and } O_T < O_M \\ \theta(1-E)O_{kj}, & \text{when } k = T \text{ and } O_T < O_M \\ 0, & \text{otherwise,} \end{cases}$$

and $$\nabla w_{kji} = \begin{cases} \rho(1-E)\lambda_{kj}O_{kj}(x_i - C_{kji})^2, & \text{when } k = M \text{ and } O_T < O_M \\ -\rho(1-E)\lambda_{kj}O_{kj}(x_i - C_{kji})^2, & \text{when } k = T \text{ and } O_T < O_M \\ 0, & \text{otherwise.} \end{cases}$$

8. The method as claimed in claim 7, further comprising a step of representing the updated differences of the parameters $C_{kji}$, $w_{kji}$, and $\lambda_{kj}$ as below in response to that $O_T$ is the maximum measured value of the output layer and $O_T < O_S + \epsilon$, where $O_S$ is the second maximum measured values of the output layer and $\epsilon$ is a small positive value:

$$\nabla C_{kji}^m = \begin{cases} -\eta_1(1-E)\lambda_{kj}O_{kj}w_{kji}(x_i - C_{kji}), & \text{when } k = M \text{ and } O_T < O_M \\ \eta_1(1-E)\lambda_{kj}O_{kj}w_{kji}(x_i - C_{kji}), & \text{when } k = T \text{ and } O_T < O_M \\ -\eta_2(1-E^a)\lambda_{kj}O_{kj}w_{kji}(x_i - C_{kji}), & \text{when } k = S, O_T = O_M \text{ and } O_T < O_S + \varepsilon \\ \eta_2(1-E^a)\lambda_{kj}O_{kj}w_{kji}(x_i - C_{kji}), & \text{when } k = T, O_T = O_M \text{ and } O_T < O_S + \varepsilon \\ 0, & \text{otherwise,} \end{cases}$$

$$\nabla \lambda_{kj}^m = \begin{cases} -\theta_1(1-E)O_{kj}, & \text{when } k = M \text{ and } O_T < O_M \\ \theta_1(1-E)O_{kj}, & \text{when } k = T \text{ and } O_T < O_M \\ -\theta_2(1-E^a)O_{kj}, & \text{when } k = S, O_T = O_M \text{ and } O_T < O_S + \varepsilon \\ \theta_2(1-E^a)O_{kj}, & \text{when } k = T, O_T = O_M \text{ and } O_T < O_S + \varepsilon \\ 0, & \text{otherwise,} \end{cases}$$

-continued and $$\nabla w_{kji}^m = \begin{cases} \rho_1(1-E)\lambda_{kj}O_{kj}(x_i - C_{kji})^2, & \text{when } k = M \text{ and } O_T < O_M \\ -\rho_1(1-E)\lambda_{kj}O_{kj}(x_i - C_{kji})^2, & \text{when } k = T \text{ and } O_T < O_M \\ \rho_2(1-E^a)\lambda_{kj}O_{kj}(x_i - C_{kji})^2, & \text{when } k = S, O_T = O_M \text{ and } \\ & O_T < O_S + \varepsilon \\ -\rho_2(1-E^a)\lambda_{kj}O_{kj}(x_i - C_{kji})^2, & \text{when } k = T, O_T = O_M \text{ and } \\ & O_T < O_S + \varepsilon \\ 0, & \text{otherwise} \end{cases}$$

-continued where $\eta_1 \geq \eta_2$, $\theta_1 \geq \theta_2$, $\rho_1 \geq \rho_2$, $E^a = 1 - e^{(O_S - O_M)/A}$, and $$O_S = \max_{k=1, k \neq M}^{K} O_k.$$

* * * * *